Patented Mar. 24, 1942

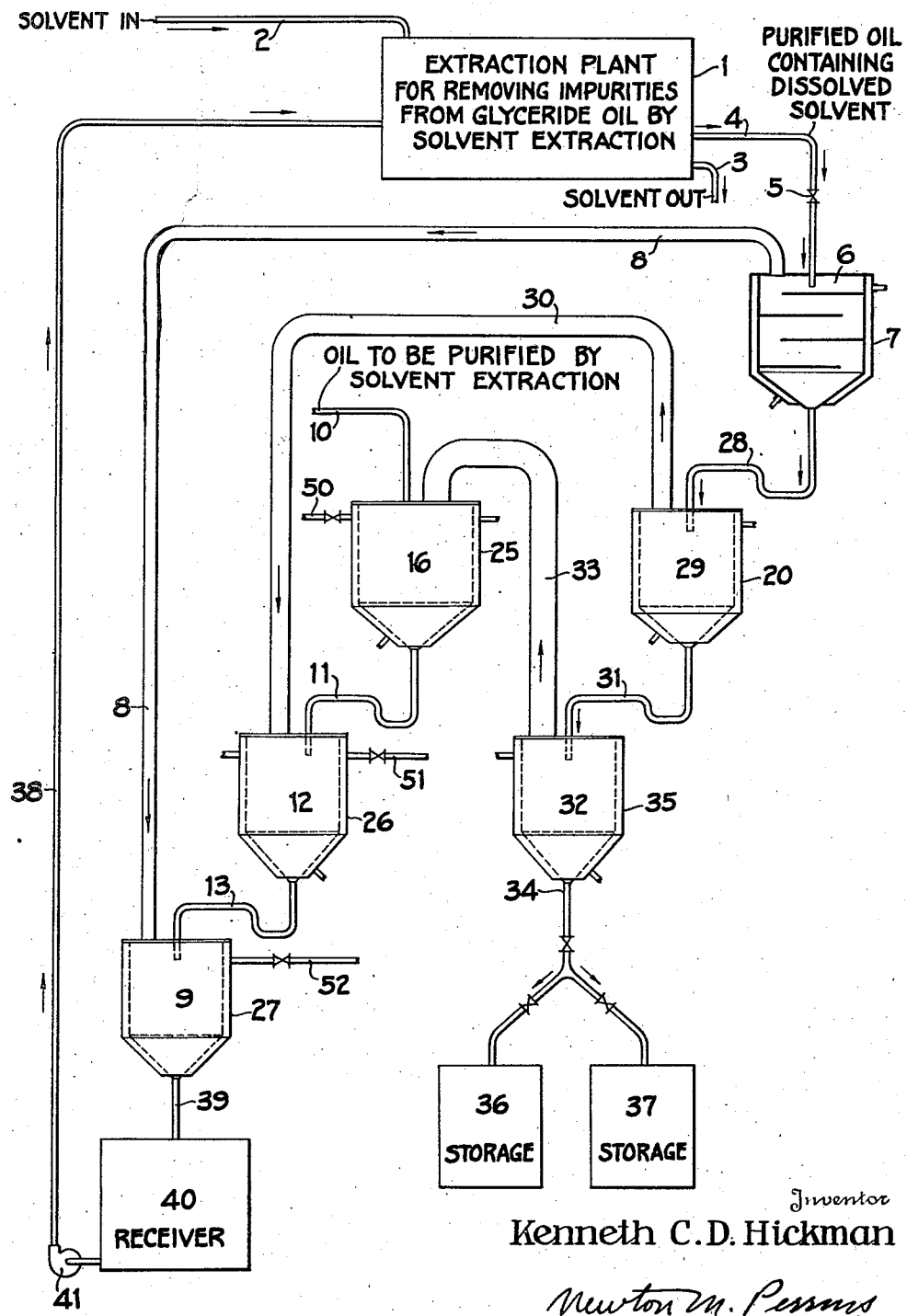

2,277,401

UNITED STATES PATENT OFFICE 2,277,401

SOLVENT RECOVERY

Kenneth C. D. Hickman, Rochester, N. Y., assignor to Distillation Products, Inc., Rochester, N. Y., a corporation of Delaware Application March 12, 1940, Serial No. 323,601

4 Claims. (Cl. 260—428)

This invention has for its object to provide improved procedure for recovering solvent from solvent extracted vegetable and animal oils and fats.

It has been proposed to extract vegetable and animal oils with solvents in order to absorb and remove impurities therefrom. The vegetable or animal oils are thoroughly contacted with the solvent, and are then permitted to stratify and the solvent layer is removed. Part of the solvent remains dissolved in the oil from which it must be removed before the oil is usable. The recovery of the solvent is desirable for reasons of economy. Such procedure is disclosed in U. S. Patent 2,090,738, A. O. Tischer, wherein vegetable and animal oils are extracted with furfural.

To effect the removal of the last traces of furfural from the treated vegetable or animal oils, I have tried the use of vapor ejector pumps. However, in such operations the furfural is wasted. Refrigerated traps can be used to condense and collect the furfural but this procedure is expensive and inconvenient because the traps must be thawed out and emptied periodically.

An object of my invention is to provide an improved method of recovering solvent whereby the foregoing difficulties are avoided. Another object is to provide an improved method for recovering furfural from vegetable or animal oils which have been extracted with this material. A still further object is to provide a method for recovering furfural from oils of the vegetable and animal type in which the solvent recovery procedure acts in conjunction with the extraction procedure in such a manner as to greatly simplify the solvent recovery process. Another object is to improve the state of the art. Further objects will become apparent from the following description and claims.

These and other objects are accomplished in accordance with my invention which includes heating the vegetable or animal oil, fat and the like from which the solvent or furfural is to be recovered and directly absorbing the solvent vapors by contacting them with a vegetable or animal oil, fat or the like which is to be subsequently extracted with the solvent and which is at a lower temperature than the heated oil from which the solvent is to be removed.

In the accompanying drawing I have illustrated diagrammatically the manner in which solvent can be economically recovered in accordance with my invention. Referring to the drawing, reference numeral 1 indicates a solvent extraction plant in which a vegetable or animal oil is extracted with a solvent. Solvent is introduced into the plant through conduit 2 and the solvent containing extracted impurities is removed through conduit 3. The purified oil which contains dissolved solvent is then withdrawn through conduit 4, valve 5, and is introduced into chamber 6 which is provided with a heating jacket 7. In chamber 6 most of the solvent dissolved in the oil is vaporized by heating and the vapors pass through conduit 8 into chamber 9.

Fresh glyceride oil which is to be eventually purified in extraction plant 1 is introduced into chamber 16 by way of conduit 10. The oil flows from chamber 16 through conduit 11 into chamber 12, thence through conduit 13 into chamber 9. Numerals 25, 26, and 27 designate cooling jackets on chambers 16, 12 and 9 respectively, which cool the oil before it is introduced into these chambers.

Vapors of solvent derived from chamber 6 and flowing through conduit 8 into chamber 9 come into contact with the fresh, cool oil and the solvent is absorbed therein. The heated oil in chamber 6 then flows through conduit 28 into chamber 29 where further amounts of solvent are expelled by heating jacket 20. These vapors pass through conduit 30 into chamber 12 where they are absorbed in cool oil derived from chamber 16. The heated oil from chamber 29 then flows through conduit 31 into chamber 32 where the last amount of solvent is vaporized by heating applied by means of jacket 35. The solvent vapor is passed through conduit 33 into chamber 16 where it is absorbed by the cool absorbent oil. The oil from which all the solvent has been vaporized flows through conduit 34 and is permitted to flow into either of storage vessels 36 or 37. Absorbent oil which has been thrice contacted with vapors in chambers 16, 12 and 9 flows from chamber 9 through conduit 39 into storage vessel 40. This oil contains the small amount of vapors which it absorbed and is withdrawn through pump 41 and conduit 38 and is treated in the extraction plant with the same solvent which it absorbed in the absorption chambers.

It will be noted that a plurality of solvent vaporizing chambers may be used and that the vapors are preferably contacted in counter-current with absorbent oil. In other words, the large amount of vapors obtained in chamber 6 is contacted with oil which already contains solvent absorbed during passage through chambers 9 and 12. The small amount of solvent vaporized in chamber 32 is contacted with a fresh absorbent oil in chamber 9. This results in thorough contact and complete recovery of the solvent.

Chambers 16, 12 and 9 are provided with conduits 50, 51 and 52, respectively, which are connected to a source of vacuum or preferably to source of progressively higher vacuum. Any air or non-absorbable gases are continuously removed from the system by these conduits. The degree of evacuation required is small. As a matter of fact, desirable results can be accomplished by merely placing a condenser around these conduits to remove and return solvent and permit the conduits to empty into the atmosphere. This necessarily means that the procedure can be carried out at ordinary pressures as well as under reduced pressure which may be as low as .001 mm. However the furfural transfer is accomplished with less wastage of furfural and less darkening of oil at pressures lower than atmospheric. Pressures between about 10 and 100 mm. are preferred. For example in the apparatus shown the pressure in chambers 6 and 9 may be about 100 mm., in chambers 29 and 12 about 25 mm. and in chambers 32 and 16 about 10 mm. The temperatures should range from about 120° C. down to about 95° C. with water cooling in the absorbers.

The heating chambers must be at a higher temperature than the absorbing chambers. The temperature difference can be obtained by extreme cooling of absorbing chambers, by high temperature heating of the heating chambers or by both expedients. In general it is best to avoid overheating and it is not necessary to use very low temperatures for cooling. Temperatures up to 150° C. are usually satisfactory although higher temperatures such as 200° or even 250° can be used especially with stable oils or fats. City water at ordinary temperature can usually be used for cooling. Ice, cooled brine, liquid air, etc., may be used if desired. Higher temperatures can be used for cooling, but it is apparent that the greater the temperature difference the greater will be the efficiency.

Although I have illustrated my invention by means of a plurality of solvent vaporizing zones and solvent absorbing zones, it will be apparent that a single solvent vaporizing and absorbing zone can be employed, particularly if provision is made for thorough vaporization and thorough contact with absorbing oil. Likewise a greater number of vaporizing and absorbing units can be employed. Counter-current contact of the vapor with the liquid is desirable but is not necessary.

What I claim is:

1. The method of recovering a solvent from vegetable and animal oils in which it is dissolved, which comprises in combination heating the oil containing the dissolved solvent while under vacuum to cause vaporization of the solvent and absorbing these vapors in the oil which is likewise under vacuum and which is at a substantially lower temperature than that at which the oil containing the solvent is heated and then subjecting the oil in which these vapors are adsorbed to solvent extraction with the same solvent.

2. The method of recovering residual solvent from vegetable and animal oils which have been solvent extracted which comprises in combination heating the oil containing the dissolved solvent to cause vaporization of the solvent, absorbing these vapors in the oil which is at a substantially lower temperature than that at which the oil containing the solvent is heated and then subjecting the oil in which these vapors are absorbed to a solvent extraction with the same solvent.

3. The process of solvent-extracting vegetable and animal oils and recovering residual solvent contained in the solvent extracted oil which comprises extracting the oil with a substantially immiscible solvent, allowing the mixture to stratify, separating the oil layer, passing this oil through a series of closed chambers maintained at successively higher temperatures, subjecting the oil while in the chambers to said successively higher temperatures and to reduced pressure whereby the residual solvent is progressively removed and converted into vapors, separately conveying the residual solvent vapors from the heated chambers into a series of relatively cool chambers, passing fresh oil to be solvent extracted in sequence through the series of cool chambers in a direction such that the fresh oil is first contacted with vapors from the lowest temperature chamber and then subjecting this fresh oil containing residual solvent to a solvent-extraction with the same solvent which it has absorbed.

4. The process defined in claim 3 in which the solvent is furfural.

KENNETH C. D. HICKMAN.